May 14, 1968  L. G. FREEMAN, JR  3,382,687
AUTOMATIC APPARATUS FOR FOLDING LEATHER PIECES
Filed May 5, 1966  3 Sheets-Sheet 1
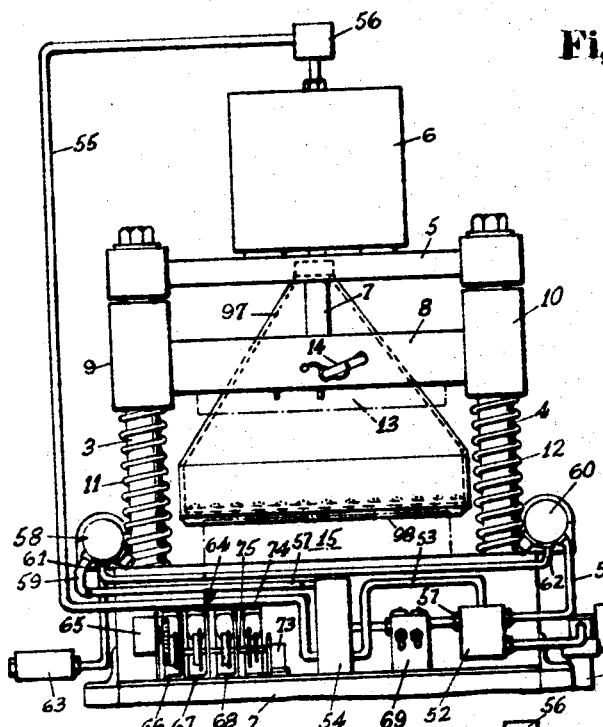
Fig. 1
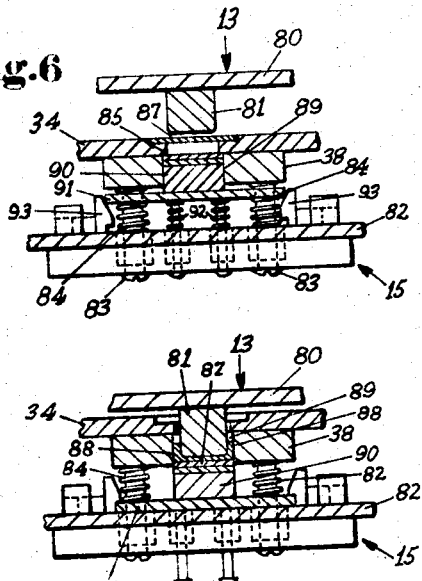
Fig. 6
Fig. 7
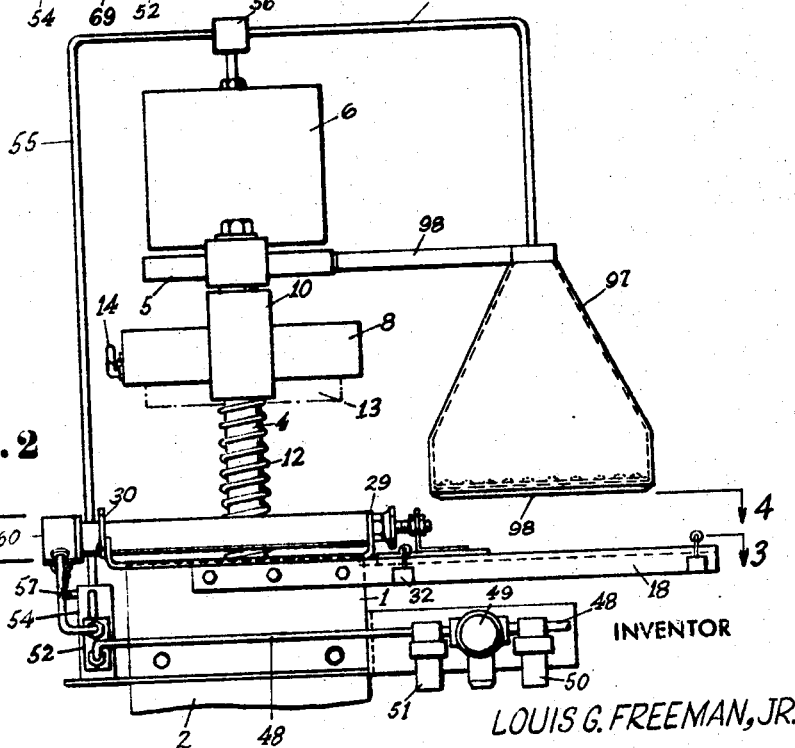
Fig. 2
INVENTOR
LOUIS G. FREEMAN, JR.,
BY Youngblut, Melville, Strasser and Foster
ATTORNEYS INVENTOR
LOUIS G. FREEMAN, JR.,
BY Yungblut, Melville, Strasser and Foster
ATTORNEYS May 14, 1968   L. G. FREEMAN, JR   3,382,687
AUTOMATIC APPARATUS FOR FOLDING LEATHER PIECES
Filed May 5, 1966   3 Sheets-Sheet 3

INVENTOR
LOUIS G. FREEMAN, JR.
BY Yungblut, Melville, Strasser and Foster
ATTORNEYS

United States Patent Office 3,382,687
Patented May 14, 1968

3,382,687
AUTOMATIC APPARATUS FOR FOLDING
LEATHER PIECES
Louis G. Freeman, Jr., Cincinnati, Ohio, assignor to The
Louis G. Freeman Company, Cincinnati, Ohio, a corporation of Ohio
Filed May 5, 1966, Ser. No. 547,972
9 Claims. (Cl. 69—1)

ABSTRACT OF THE DISCLOSURE

An automatic machine for turning or folding the edges of a leather or similar workpiece, the machine including a fixed lower platen mounting a lower die assembly and an upper platen vertically movable toward and away from the lower platen, the upper platen mounting an upper die assembly, the lower die assembly having a horizontally disposed plate movable between a forward and a rearward position of use, the plate being operatively connected to an actuating bar movable along guide rails projecting rearwardly from the lower platen, power means being provided for raising and lowering the upper platen member in timed relation to the movement of said plate.

---

As taught in Louis G. Freeman, Jr., U.S. Patent 3,073,141, dated Jan. 15, 1963, and entitled, Apparatus for Folding Leather Pieces and the Like, the folding of the marginal edges of the workpiece is accomplished by means of a coacting set of upper and lower die elements fitted in a machine provided with a vertically reciprocating upper platen coacting with a fixed lower platen or anvil. The upper die element is secured to the upper platen for movement therewith, the lower die element being secured to the base platen, so that upon reciprocating movement of the upper platen, the upper and lower dies are caused to engage and effect the desired turning or folding of the workpiece.

Machines of the type characterized above, which are generally referred to as cut-out machines, have been employed in shoe manufacturing plants to perform a variety of cutting and marking operations. Usually they are treadle actuated, the treadle when tripped by the operator causing the machine to move through its cycle of operation which comprises a down stroke of the upper platen, a dwell with the dies carried by the platens in engagement, and a return or up stroke, with the machine coming to rest when the upper platen has returned to its elevated position.

In accordance with the teachings of the aforementioned Freeman Patent 3,073,141, the lower die element is provided with a horizontally movable sliding plate having a forwardly projecting handle by means of which the plate may be manually moved by the operator back and forth relative to the remainder of the lower die element. In operating the apparatus, the operator must first move the sliding plate forwardly, place a workpiece in proper position on the plate, manually move the plate rearwardly, actuate the machine for downward and return movement of the upper platen, manually move the plate forwardly, and again actuate the machine for reciprocating movement of the upper platen for a second time with the plate in its forward position. Thus, for each workpiece being acted upon, the operator must manually shift the sliding plate twice, and must also manually actuate the machine to reciprocate the upper platen twice. In addition, in order to prevent damage to the dies, care must be taken to be certain that the sliding plate is shifted to its fully forward or fully rearward position.

As contrasted to the foregoing, the instant invention provides an automatic turning machine in which the foregoing operations are performed automatically, the operator having only to position the workpiece on a sliding plate forming a part of the lower die element and then actuate a treadle or other actuating device, whereupon the machine acts to automatically move the plate rearwardly and accurately align it with respect to the die elements, whereupon the upper platen member is automatically actuated, followed by the return of the sliding plate to its forward position and the second reciprocating movement of the upper platen member.

Accordingly, a principal object of the instant invention is the provision of an automatic turning machine which, upon actuation, will perform a programmed series of operations and, at the same time, will assure accurate registry of the sliding plate with respect to the upper and lower die elements.

Still a further object of the invention is the provision of an automatic turning machine of the character described which will prevent actuation of the reciprocating platen member in the event the sliding plate is out of registry with respect to the die elements.

Still a further object of the invention is the provision of improved means for stripping finished workpieces from the die, such means acting automatically as an incident of the operating cycle of the machine.

The foregoing, together with other objects of the invention which will appear hereinafter, or which will be apparent to the skilled worker in the art upon reading this specification, are accomplished by that construction and arrangement of parts of which an exemplary embodiment shall now be described.

Reference is made to the accompanying drawings wherein:

FIGURE 1 is a front elevational view of a turning machine in accordance with the instant invention.

FIGURE 2 is a side elevational view thereof.

FIGURES 6 through 10 are fragmentary vertical sectional views taken along the line 6—6 of FIGURE 4 illustrating successive stages in the movement of the upper and lower die elements.

Figure 3:
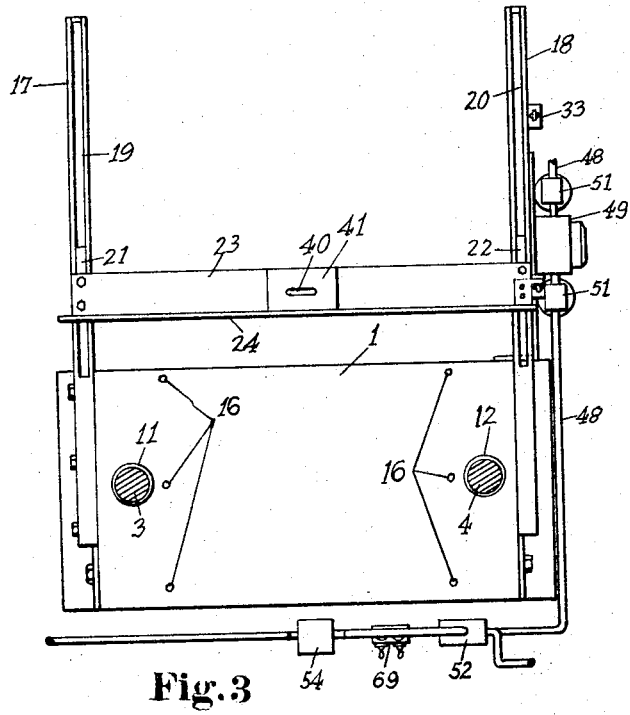
FIGURE 3 is a horizontal sectional view taken along the line 3—3 of FIGURE 2.
Figure 8:
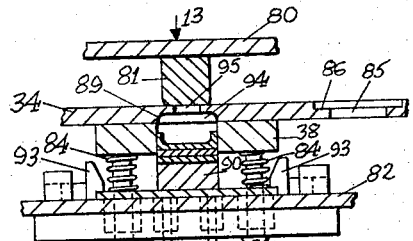

Referring first to FIGURES 1 and 2 of the drawings, the turning machine of the instant invention comprises a bench type machine having a base or fixed platen member 1 mounted on a table or bench 2 which supports the machine. A pair of vertical standards 3 and 4 project upwardly from the base 1, the standards being interconnected at their uppermost ends by bracket member 5 which mounts a high pressure pneumatic cylinder 6 having a downwardly projecting piston rod 7 connected at its lowermost end to the vertically movable upper platen member 8. The upper platen member 8 is mounted for vertical movement by means of sleeves 9 and 10 which surround the vertical standards 3 and 4, respectively, the upper platen member being normally biased to its uppermost of inoperative position by means of helical springs 11 and 12 surrounding the vertical standards 3 and 4, respectively, and extending between the lower platen member 1 and the lowermost ends of the sleeves 9 and 10.

An upper die element, indicated diagrammatically at 13, is adapted to be secured to the upper platen member 8, the upper platen member being provided with die locking mechanism indicated at 14. Similarly, a lower die element indicated diagrammatically at 15 is mounted on the lower platen member 1, such die element being held in place by means of locating pins 16 (see FIGURE 3) projecting upwardly from platen member 1. The upper and lower die elements 13 and 15 will be in vertical alignment such that, when the pneumatic cylinder 6 is actuated, the upper platen member 8 will move downwardly so as to bring the upper die element 13 into operative contact with the lower die element 15.

As best seen in FIGURE 3, a pair of horizontally disposed elongated arms 17 and 18 project rearwardly from the lower platen member 1 at the opposite sides thereof, the arms having channels 19 and 20 formed in their respective upper surfaces in which sliding blocks 21 and 22 are received, the sliding blocks having their uppermost surfaces projecting above the channels 19 and 20 so that the actuating bar 23 may be secured at its opposite ends to the sliding blocks for movement therewith lengthwise of the arms 17 and 18.

Figure 4:
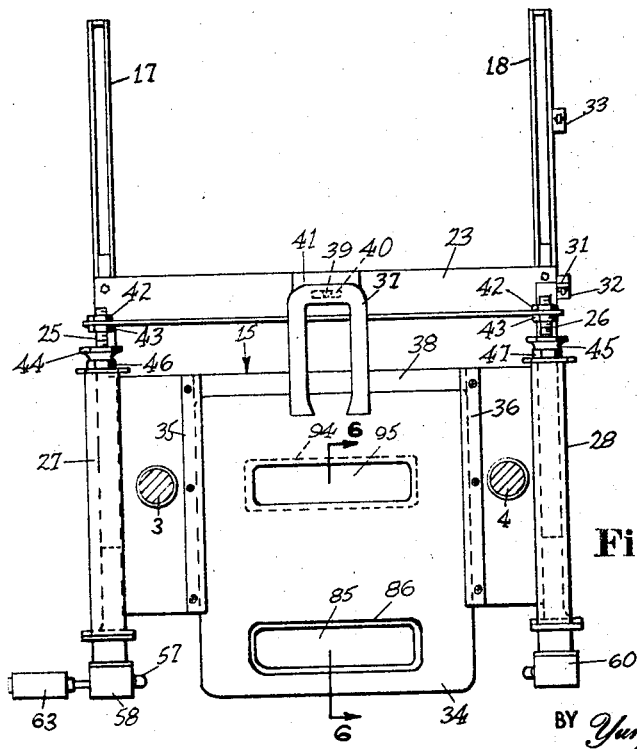
FIGURE 4 is a horizontal sectional view similar to FIGURE 3 but taken along the line 4—4 of FIGURE 2 and additionally showing the lower die element mounted in place.

The actuating bar 23 has an upturned flange 24 which, as best seen in FIGURE 4, receives the free ends of piston rods 25 and 26 of pneumatic cylinders 27 and 28, respectively, mounted on opposite sides of the lower platen 1, as by means of brackets 29 and 30 as seen in FIGURE 2. When the piston rods 25 and 26 are in their retracted position, the actuating bar 23 will lie in the position illustrated in FIGURE 4 wherein it will be seen that an outwardly projecting finger 31 secured to one end of the actuating bar is in contact with the limit switch 32 which may be conveniently mounted on the arm 18. When the piston rods 25 and 26 are in their extended position, the parts assume the condition illustrated in FIGURE 5, wherein it will be seen that the actuating bar has been moved rearwardly along the arms 17 and 18, and the finger 31 is now in contact with limit switch 33 also mounted on arm 18.

Figure 5:
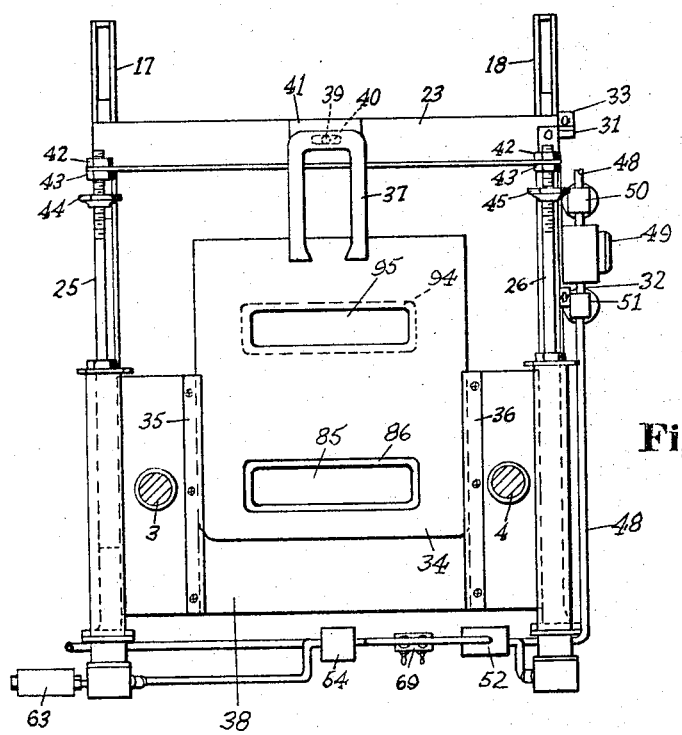
FIGURE 5 is a horizontal sectional view similar to FIGURE 4 but illustrating the sliding plate of the lower die element in its alternate position of use.

FIGURES 4 and 5 also illustrate the sliding plate 34 forming a part of the lower die elements 15, the sliding plate being mounted in guide channels 35 and 36 and having a rearwardly projecting handle 37 by means of which the plate may be moved back and forth relative to the underlying die block 38. The handle 37 has a downwardly projecting pin 39 which is received in a slot 40 in attachment block 41 mounted on the actuating bar 23. Thus, upon rearward movement of the actuating bar 23, the sliding plate will be caused to move from the position illustrated in FIGURE 4 to the position illustrated in FIGURE 5, the extent of movement of the sliding plate being determined by the stroke of piston rods 25 and 26.

Means are provided to adjust the length of travel of the actuating bar 23 to assure that the sliding plate will assume both its fully forward and fully rearward position. Thus, the free ends of the piston rods 25 and 26 are threaded and by varying the positions of the sets of nuts 42, 43, the extent of the rearward travel of the actuating bar and of the sliding plate may be accurately controlled. The forward position of the actuating bar is adjusted by means of the adjustment nuts 44 and 45 which are also threaded on the ends of the piston rods, the nuts being adapted to abut against the end caps 46 and 47 of the cylinders 27 and 28, respectively, thereby establishing the fully retracted position of the piston rods and hence the extent of forward movement of the actuating bar and the sliding plate. Preferably, the adjustment nuts will have elongated necks as ilustrated and will be provided with set screws (not shown) to fix them in adjusted position. It will be understood, of course, that the limit switches 32 and 33 will be positioned so as to be closed when the actuating bar reaches its innermost and outermost positions.

Both the upper platen actuating cylinder 6 and the cylinders 27 and 28 controlling movement of the actuating bar 23 are pneumatically driven, air under pressure being supplied through inlet conduit 48, the inlet conduit including a pressure regulator 49, a filter 50 and, preferably, a lubricating device 51 which introduces a minute quantity of oil into the system to lubricate the moving parts of the pneumatic cylinders.

The trailing end 48a of the inlet conduit is connected to a distributor 52 which channels a portion of the pressurized air through conduit 53, solenoid actuated valve 54 and conduit 55 connected through one-way pressure relief valve 56 to pneumatic cylinder 6. A supply conduit 57 extends from distributor 52 to a four-way solenoid actuated valve 58 operatively connected to cylinder 27; and similarly a supply conduit 59 is connected to a four-way solenoid actuated valve 60 operatively connected to cylinder 28. Vent conduits 61 and 62 are connected to a common pressure regulator or speed controller 63 which controls the rate at which the piston rods are moved back and forth. In this connection, it will be understood that the cylinders 27 and 28 are the type having internal conduits operative to supply pressurized air to, and event, the opposite ends of the cylinders.

Figure 12:
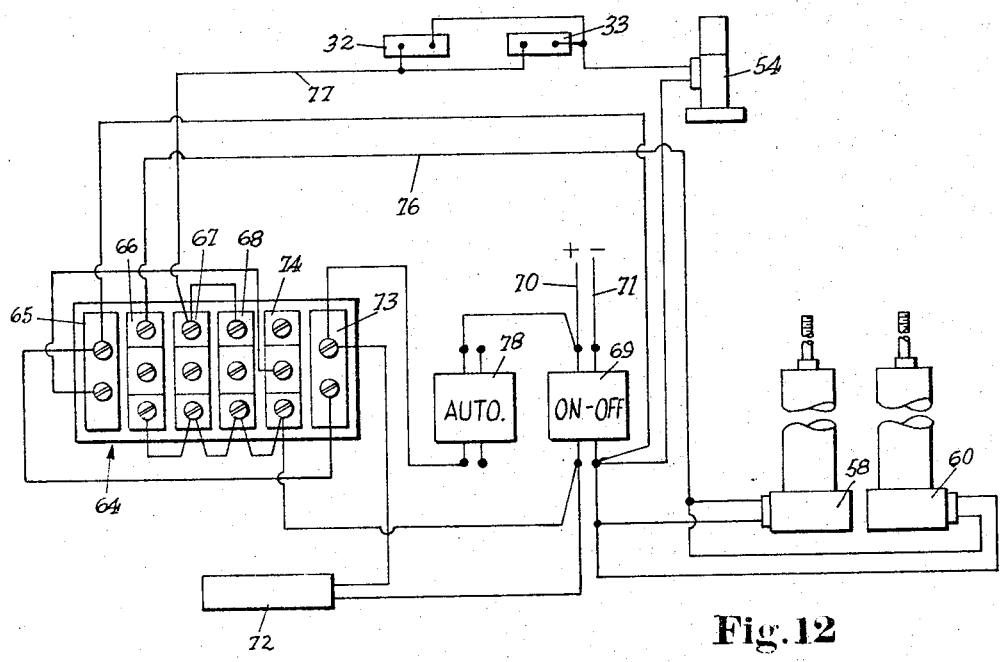
FIGURE 12 is a wiring diagram for the machine.

The solenoid actuated valves 54, 58, and 60 are controlled by means of the timing unit 64—which is a commercially available unit—having a synchronous motor 65 which drives a series of timing cams 66, 67 and 68 which are adjustable to provide both the desired sequence of operation for the valves as well as the time cycle during which the valves will be opened or closed. Their operation can be best understood by reference to the wiring diagram shown in FIGURE 12. As seen therein, current is supplied to the manually controlled on-off switch 69 through leads 70 and 71. When the switch 69 is closed a circuit is formed through foot treadle 72 to solenoid 73 which, when actuated, closes control switch 74 to thereby complete the circuit to motor 65 which, through drive shaft 75, rotates the timing cams 66, 67, and 68 which, in effect, act as on-off switches for the solenoid valves 54, 58, and 60. Thus, the timing cam 66 forms a circuit through lead 76 to the solenoid valves 58 and 60 controlling the movement of the piston rods 25 and 26 of cylinders 27 and 28. When the actuating bar 23 reaches its rearmost position, the limit switch 33 will be closed, thereby effecting a circuit through lead 77 to timing cam 67 which will also close, thereby energizing solenoid valve 54 controlling pneumatic cylinder 6. It will be evident that should the actuating bar 23 fail to travel rearwardly the full distance, limit switch 33 will remain open and the valve 54 will not be actuated to move the upper platen member. After the proper dwell, the timing cam 67 will reopen the circuit through lead 77 and solenoid valve 54 will close, thereby permitting the upper platen to return to its elevated position. At this juncture, timing cam 66 will again actuate the solenoid valves 58 and 60—which it will be remembered are four-way valves—this time the valves acting to reciprocate the piston rods in the opposite direction, thereby moving the actuating bar 23 to its forward position. When the actuating bar reaches the fully forward position, the limit switch 32 is closed and a circuit is again affected to solenoid valve 54, this time through timing cam 68. This causes the upper platen member to reciprocate a second time, thereby completing the operating cycle of the machine. It will be understood that the control switch 74 will be automatically opened at the end of the operating cycle, the solenoid 73 which initially actuated the switch having been deenergized upon release of the foot treadle 72.

Should it be desired to operate the machine automatically, the automatic operation switch 78 may be closed which, in effect, bypasses the foot treadle 72 so that the solenoid 73 will remain actuated and hence retain the control switch 74 in the closed position. Where the automatic switch 78 is employed, the machine will automatically recycle without the intervention of the operator.

For an understanding of how the mechanism just described acts to turn the edges of a workpiece, reference is now made to FIGURES 6 through 10 which illustrate exemplary die mechanism of the type disclosed in U.S. Patent 3,073,141 and illustrate successive stages in the following of a workpiece. The upper die element 13 comprises a base plate 80 mounting a male die 81 configured to conform to the body of the workpiece being acted upon and which, in the embodiment illustrated, comprises a rectangular piece.

The lower die element 15 comprises a base plate 82 adapted to be supported on the lower platen member 1, the base plate mounting the die block 38 which, as previously described, is provided with guide channels 35 and 36 mounting the horizontally movable sliding plate 34 provided with the rearwardly projecting handle 37 by means of which the plate is moved back and forth relative to the die block. The die block is supported by a plurality of vertically movable guide pins 83 surrounded by springs 84 extending between the base plate 82 and the die block, the springs normally serving to bias the die block to its uppermost position.

Figure 11:
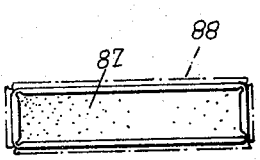
FIGURE 11 is a plan view of a piece folded by means of the die illustrated in FIGURES 6 through 10.

As best seen in FIGURES 6 and 7, the sliding plate 34 is provided with an orifice 85 through which the male die 81 is adapted to pass, the orifice being surrounded by a recessed shoulder 86 which supports the marginal edges of the workpiece to be folded. The shoulder 86 thus serves as a means for positioning the workpiece in alignment with the die elements. A workpiece is illustrated at 87 in FIGURE 11, the marginal edges thereof which are supported by the shoulder 86 being indicated in dotted lines at 88.

The sliding plate 34 has a forward or loading position in which it projects forwardly from the machine, such position being illustrated in FIGURES 4, 8, 9, and 10; and it will be understood that when the sliding plate is in its forward or loading position, the operator will place a workpiece in the recess defined by the shoulder 86, whereupon the machine will be actuated and the sliding plate moved rearwardly to its operating position in which the workpiece is in vertical alignment with the male die 81.

A female die cavity 89 is formed in the die block 38 in vertical alignment with the male die 81. The cavity 89 extends through the die block and is normally closed by a pressure block 90 mounted on a pressure plate 91 overlying the base plate 82, the pressure block being biased upwardly by means of springs 92 as will be clearly evident from FIGURE 6. The pressure block 90 thus normally fills the female die cavity 89 but is moved downwardly by the male die 81 as it enters the female die cavity.

When the sliding plate 37 has moved to its rearmost position and the timing cam 66 has actuated the pneumatic cylinder 6 which moves the upper platen member 8 downwardly, the male die 81 will move downwardly through the orifice 89, carrying the workpiece 87 with it, the marginal edges 88 of the workpiece being turned upwardly about the sides of the male die element in the manner illustrated in FIGURE 7, wherein it will be seen that the marginal edges 88 of the workpiece are maintained in an upwardly turned position by the walls of the female die cavity 89. At the same time the downward movement of the male die 81 moves the pressure block 90 and the plate 91 downwardly, the plate 91, when the upper die element reaches its lowermost position, being juxtaposed to the upper surface of base plate 82. As the plate 91 moves downwardly it contacts the spring biased locking elements 93 which are cammed outwardly by the plate but which, when the plate seats against the base plate 82, spring inwardly to lock the pressure plate 91 and block 90 in a retracted position so that, as the male die 81 travels upwardly on its return stroke, the workpiece 87 will remain in the female die cavity seated against the upper surface of the block 90.

As will be evident from an inspection of FIGURE 6, the wall surfaces of the orifice 85 in the sliding plate 34 are offset inwardly with respect to the wall surfaces of the female die cavity 89. This offset provides an abutment effective to prevent the workpiece from being pulled upwardly by the male die 81 should the blank tend to stick to the die, the free edges of the upwardly turned marginal portions 88 engaging beneath the abutmnt provided by the inwardly offset walls of the orifice.

When the male die 81 has returned to its uppermost position, the timing cam 67 will actuate the piston rods 25 and 26 to return the sliding plate to its forward or loading position so that another workpiece may be placed in the recess defined by the shoulder 86. However, as will be seen in FIGURE 8, when the sliding plate 34 is moved to its forward position, a configured cavity 94 formed in the undersurface of the plate 34 will be brought into vertical alignment with the female die cavity 89. As will be apparent from FIGURE 4, the cavity 94 is configured to conform to the body of the workpiece being folded; and again with reference to FIGURE 8, it will be seen that the wall surfaces of the cavity 94 are curved inwardly.

When the sliding plate has returned to its fully forward position, the timing cam 68 will actuate pneumatic cylinder 6 so as to move the upper platen member downwardly, thus causing the male die 81 to strike the upper surface of the sliding plate, and move both the plate and the underlying die block 38 downwardly against the compression of the springs 84. This movement acts to displace the female die cavity 89 downwardly about the pressure block 90, thereby causing the blank 87 to be pushed upwardly into the cavity 94, the rounded edges of the cavity causing the upwardly projecting marginal areas 88 of the blank to be folded inwardly to the position illustrated in FIGURE 9. The marginal edges 88 of the workpiece will thus be turned or folded inwardly—such marginal edges usually having an adhesive substance pre-applied thereto which cause the folded marginal edges to adhere to the underlying portions of the workpiece contacted thereby.

Figure 9:
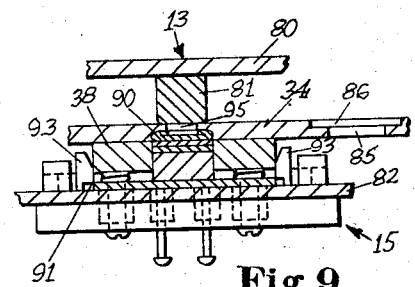
Figure 10:
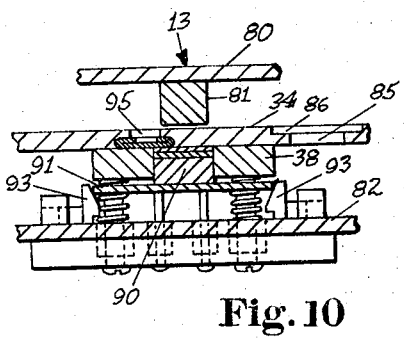

The second downward stroke of the upper platen additionally acts to drive the die block 38 to its lowermost position; and as the die block moves downwardly, it exerts a camming action against the spring press locking elements 93, as illustrated in FIGURE 9, thereby releasing the pressure plate 91 for upward movement, the parts returning to the positions illustrated in FIGURE 10. In this position the now folded piece 87 is contained wholly within the cavity 94, the uppermost surface of the pressure block 90 lying essentially co-planar with the upper surface of die block 38. Then, when the sliding plate 34 is moved rearwardly to its operating position during the next operating cycle of the machine, the already folded workpiece contained in the cavity 94 will be carried rearwardly and will be retained in the cavity until the pneumatic cylinder 6 has been actuated and the pressure in the cylinder released by the pressure relief valve 56, whereupon a blast of air under pressure will be directed downwardly through the port 95 overlying the folded workpiece to push it downwardly from the cavity 94 where it may be collected and removed from the machine.

Referring again to FIGURES 1 and 2 of the drawings, a conduit 96 is connected to the outlet side of pressure relief valve 56, the conduit extending into the upper end of a hood 97 suspended from an arm 98 secured to bracket member 5. The hood 97 is positioned so as to overlie the sliding plates 34 when it is in its rearmost position; and preferably the hood will be provided about its periphery with inwardly and downwardly projecting resilient flaps or gasket members 98 which will contact or lie in close proximity to the sliding plates.

When the pneumatic cylinder 6 has completed its downward movement to bring the upper and lower die elements to the position illustrated in FIGURE 7, the solenoid control valve 54 will be closed by the action of timing cam 66, whereupon the one-way pressure control valve 56 will open to vent the cylinder 6 and the compressed air from the cylinder—which is under high pressure—will be vented through the conduit 96 and ejected downwardly through the hood 97. The blast of air so released will cause the flaps or gasket members 98 to seal against the upper surface of plate 34 in an area surrounding the port 95, and consequently the force of the compressed air will be exerted downwardly through the port 95 onto the workpiece contained in the cavity 94 and the workpiece will be expelled downward from the sliding plate into a suitable container underlying the cavity 94.

Modifications may be made in the invention without departing from its spirit and purpose and it is not intended that the invention be limited other than in the manner set forth in the claims which follow.

The embodiments of the invention in which an exclusive property or privilege is claimed are defined as follows:

1. In a machine for folding flexible pieces having a lower fixed platen and an upper platen vertically movable toward and away from said lower platen, a lower die assembly mounted on said lower platen, said die assembly including a horizontally disposed plate slidable relative to said die assembly between a forward and a rearward position of use, a coacting upper die assembly mounted on said upper platen, guide rails projecting rearwardly from said lower platen, and an actuating bar movable along said guide rails, means operatively connecting said sliding plate to said actuating bar for movement therewith, power means connected to said actuating bar for moving said bar and said plate between said forward and said rearward positions, power means connected to said upper platen for moving it from an elevated inoperative position to a lowermost operative position in which the upper and lower die assemblies are in contact, and power actuating means operative to sequentially actuate the moving means for said actuating bar and said upper platen so as to bring said upper die assembly into contact with said lower die assembly when said sliding plate is in its alternate positions of use.

2. The machine claimed in claim 1 wherein said platen moving means comprises a pneumatic cylinder, wherein said actuating bar moving means comprises at least one pneumatic cylinder, and wherein said actuating means includes conduit means connecting said cylinders to a source of air under pressure and valve means operable to selectively introduce air under pressure to said cylinders and vent the same.

3. The machine claimed in claim 2 wherein said valve means comprise solenoid actuated valves, and wherein said actuating means includes a timing device having a series of solenoid actuating relays.

4. The machine claimed in claim 2 wherein air under pressure vented from said upper platen moving cylinder is passed through means positioned to cause vented air to impinge upon said sliding plate when in its rearward position.

5. The machine claimed in claim 4 wherein said last named means includes a hood overlying said sliding plate, said hood having a peripheral sealing means positioned to contact said sliding plate.

6. The machine claimed in claim 5 including means operative to prevent actuation of said upper platen moving means unless said sliding plate is in its fully forward or fully rearward position.

7. The machine claimed in claim 6 wherein said actuation preventing means comprises limit switches positioned to be contacted by said actuating bar, and wherein said limit switches are operatively connected to said solenoid actuating relays.

8. The machine claimed in claim 1 including adjustable means interconnecting said actuating bar and said actuating bar moving means operative to alter the position of the actuating bar relative to said sliding plate when said actuating bar is in its forward position.

9. The machine claimed in claim 8 wherein said actuating bar moving means comprises at least one pneumatic cylinder having a piston rod the free end of which is connected to said actuating bar, and wherein said adjustment means comprises an adjustment nut movable axially along said piston rod intermediate said actuating bar and the adjacent end of the pneumatic cylinder.

References Cited

UNITED STATES PATENTS

| | | | |
|---|---|---|---|
| 2,280,346 | 4/1942 | Noecker | 12—55 |
| 2,440,113 | 4/1948 | Noecker | 69—1 |
| 2,453,623 | 11/1948 | Gilbert et al. | 12—55 X |
| 3,073,141 | 1/1963 | Freeman | 69—1 |

JORDAN FRANKLIN, *Primary Examiner.*

A. R. GUEST, *Examiner.*